United States Patent
Lee et al.

(10) Patent No.: US 11,530,136 B2
(45) Date of Patent: Dec. 20, 2022

(54) PREPARATION METHOD OF HEXAGONAL MOLYBDENUM OXIDE NANOROD

(71) Applicant: LG CHEM, LTD., Seoul (KR)

(72) Inventors: Dongjun Lee, Daejeon (KR); Seokhyun Yoon, Daejeon (KR); Byunggook Lyu, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 343 days.

(21) Appl. No.: 16/753,382

(22) PCT Filed: Nov. 23, 2018

(86) PCT No.: PCT/KR2018/014548
§ 371 (c)(1),
(2) Date: Apr. 3, 2020

(87) PCT Pub. No.: WO2019/103536
PCT Pub. Date: May 31, 2019

(65) Prior Publication Data
US 2020/0283306 A1   Sep. 10, 2020

(30) Foreign Application Priority Data
Nov. 24, 2017   (KR) .................. 10-2017-0158922

(51) Int. Cl.
*C01G 39/02* (2006.01)
*H01G 11/46* (2013.01)
(Continued)

(52) U.S. Cl.
CPC ............ *C01G 39/02* (2013.01); *H01G 11/46* (2013.01); *B82Y 30/00* (2013.01); *B82Y 40/00* (2013.01);
(Continued)

(58) Field of Classification Search
None
See application file for complete search history.

(56) References Cited

U.S. PATENT DOCUMENTS

2017/0216819 A1   8/2017   Song et al.

FOREIGN PATENT DOCUMENTS

| CN | 101531401 A | 9/2009 |
|---|---|---|
| CN | 104371715 A | 2/2015 |

(Continued)

OTHER PUBLICATIONS

Zhou et al., "Synthesis of Hexagonal MoO3 Nanorods and a Study of Their Electrochemical Performance as Anode Materials for Lithium-Ion Batteries", Journal of Materials Chemistry A, 2015, vol. 3, pp. 7463-7468.
(Continued)

*Primary Examiner* — Sarah A. Slifka
(74) *Attorney, Agent, or Firm* — Dentons US LLP (57) ABSTRACT

The preparation method according to the present disclosure is to easily prepare hexagonal molybdenum oxide (h-MoO$_3$) having a nanorod shape even in a low temperature precipitation reaction at atmospheric pressure without applying hydrothermal synthesis under high temperature and high pressure conditions. The hexagonal molybdenum oxide (h-MoO$_3$) nanorods prepared therefrom can be properly mixed with carbon-based conductive materials such as carbon nanofiber, and thus can be usefully used as an anode material for a pseudocapacitor.

12 Claims, 9 Drawing Sheets

(51) Int. Cl.
 *B82Y 30/00* (2011.01)
 *B82Y 40/00* (2011.01)
(52) U.S. Cl.
 CPC ...... *C01P 2002/72* (2013.01); *C01P 2004/03* (2013.01); *C01P 2004/16* (2013.01); *C01P 2006/40* (2013.01)

(56) References Cited

FOREIGN PATENT DOCUMENTS

| CN | 106006582 A | 10/2016 |
|---|---|---|
| CN | 106976909 A | 7/2017 |
| CN | 107021523 A | 8/2017 |
| CN | 103342388 A | 10/2018 |
| KR | 10-2016-0026784 A | 3/2016 |

OTHER PUBLICATIONS

Quin et al., "Preparation of Flower-Like ZnO Nanoparticles in a Cellulose Hydrogel Microreactor", BioResources, Mar. 2017., vol. 12, 2, pp. 3182-3191.
Chithambararaj, et al., "Hydrothermally Synthesized h-MoO3 and α-MoO3 Nanocrystals: New Findings on Crystal-Structure-Dependent Charge Transport", Crystal Growth and Design, 2016, vol. 16, pp. 1984-1995.
Yang et al., "Low Temperature Sonochemical Synthesis of Morphology Variable MoO3 Nanostructures for Performance Enhanced Lithium Ion Battery Applications", Electrochimica Acta, 2015, vol. 185, pp. 83-89.
Zheng et al., "Novel Metastable Hexagonal MoO3 Nanobelts: Synthesis, Photochromic, and Electrochromic Properties", Chemistry of Materials, 2009, vol. 21, pp. 5681-5690.
Chithambabaraj et al., "Flower-Like Hierarchical h-MoO3: New Findings of Efficient Visible Light Driven Nano Photocatalyst for Methylene Blue Degradation", Catalysis Science & Technology, 3(5), 1405.
Kumar et al., "Synthesis of Pyramidal and Prismatic Hexagonal MoO3 Nanorods Using Thiourea", CrystEngComm, 2013, 15(38), 7663.
Shao et al., "Inducing Growth of Highly Ordered Molybdenum Oxide Nanoplates Under Ambient Conditions", Journal of Materials Research, 23(10), 2008, pp. 2602-2608.
Sen et al., "Synthesis of Molybdenum Oxides and Their Electrochemical Properties Against Li", Energy Procedia 54, 2014, pp. 740-747.
Sun et al., "High Energy Density Asymmetric Supercapacitors Based on Polyaniline Nanotubes and Tungsten Trioxide Rods", Ionics., vol. 21, Issue. 8, pp. 2309-2317.
Song et al., "Synthesis of Metastable h-MoO3 by Simple Chemical Precipitation", Materials Chemistry and Physics., vol. 102, Issue. 2-3, pp. 245-248.
Syntheis of MoO3 Nano Rods Via a Solution Approach at a Low Temperature, Apr. 30, 2009 (5 Pages).
Bin Hui et al., "Low-temperature synthesis of hierarchical flower-like hexagonal molybdenum trioxide films on wood surfaces and their light-driven molecular responses", Journal of Material Science, vol. 51, Aug. 19, 2016, pp. 10926-10934.
Jianfeng Huang et al., "Assembled-sheets-like MoO3 anodes with excellent electrochemical performance in Li-ion battery", Journal of Alloys and Compounds, vol. 688, Jul. 9, 2016, pp. 588-595.
V. V. Atuchin et al., "Morphology and Structure of Hexagonal MoO3 Nanorods", Inorganic Materials., vol. 44, No. 6, May 30, 2008, pp. 622-627.
S. R. Dhage et al., "Low temperature fabrication of hexagon shaped h-MoO3 Nanorods and its phase transformation", Materials Chemistry and Physics, vol. 114, Apr. 15, 2009, pp. 511-514.
"Experiment 43: Preparation of nono-zine oxide by polysaccharide stabilizer and its characterization", College Chemistry Experiments, edited by Qiuhua Yang, published by Tianjin University Press, publication data: May 31, 2012, pp. 259-262.

PREPARATION METHOD OF HEXAGONAL MOLYBDENUM OXIDE NANOROD

The present application is a National Phase entry pursuant to 35 U.S.C. § 371 of International Application No. PCT/KR2018/014548 filed on Nov. 23, 2018, and claims priority to and the benefit of Korean Patent Application No. 10-2017-0158922 filed on Nov. 24, 2017 with the Korean Intellectual Property Office, the disclosures of which are incorporated herein by reference in their entirety.

FIELD

The present disclosure relates to a preparation method of a hexagonal molybdenum oxide nanorod.

BACKGROUND

Supercapacitors, which are energy storage devices, have a variety of applications ranging from small to large, and are characterized by high power density, fast charge and discharge cycles, and long charge and discharge cycle life. Among supercapacitors, pseudocapacitors use metal oxides as electrode materials. Recently, many studies have been conducted on molybdenum oxide ($MoO_3$) having a wide operating voltage range.

Particularly, molybdenum oxide ($MoO_3$) has various crystal structures, but $\alpha$-$MoO_3$ having an orthorhombic crystal structure and h-$MoO_3$ having a hexagonal crystal structure are typical. It is known that $\alpha$-$MoO_3$ can store 1.5 lithium ions, whereas h-$MoO_3$ can store 1.6 lithium ions and thus has higher capacity. In addition, lithium ions can be inserted into all three sides of the h-$MoO_3$ crystal structure, whereas with $\alpha$-$MoO_3$, insertion is only possible in the planar direction. Therefore, h-$MoO_3$ is expected to have more advantages in power characteristics.

However, the hexagonfal molybdenum oxide has a metastable crystal structure, which is difficult to synthesize by a general sintering method. Accordingly, the hexagonal molybdenum oxide is mostly synthesized by hydrothermal synthesis at high temperature and high pressure. However, this synthesis method is not suitable for mass production, and has limitations in actual commercialization due to problems such as stability and process cost.

Therefore, there is a continuing demand for a method of mass-producing hexagonal molybdenum oxide (h-$MoO_3$) that is useful as an electrode material for a pseudocapacitor in an inexpensive process by a low temperature precipitation reaction rather than the hydrothermal synthesis at high temperature and high pressure.

SUMMARY

The present disclosure provides a preparation method of a hexagonal molybdenum oxide nanorod.

The present disclosure also provides a hexagonal molybdenum oxide nanorod prepared by the abovementioned method.

The present disclosure also provides an anode for a pseudocapacitor including the hexagonal molybdenum oxide nanorod.

In order to solve the abovementioned problems, a preparation method for a hexagonal molybdenum oxide (h-$MoO_3$) nanorod is provided, including the steps of: preparing a mixed aqueous solution containing a precursor material of molybdenum oxide and water-soluble cellulose; and heating the mixed aqueous solution to a temperature of 50° C. to 100° C., and then adding an inorganic acid.

DETAILED DESCRIPTION

Hereinafter, the present disclosure will be described in detail for each step.

(Step 1) Preparing a Mixed Aqueous Solution Containing a Precursor Material of Molybdenum Oxide and Water-Soluble Cellulose The present disclosure is characterized in that hexagonal molybdenum oxide (h-MoO$_3$) is synthesized in the form of nanorods by precipitating a precursor material of molybdenum oxide from an aqueous solution containing a precursor material of molybdenum oxide, at a low temperature.

Step 1 is to prepare a mixed aqueous solution containing water-soluble cellulose such as carboxymethyl cellulose (CMC) as a structuring agent so that the molybdenum oxide to be prepared by a precipitation reaction between an inorganic acid and the precursor material of the molybdenum oxide, in a subsequent step, has a nanorod shape of hexagonal crystal structure.

First, the precursor material of molybdenum oxide used in step 1 may be a material that is stable in an aqueous solution to form the nanorod shape of a hexagonal crystal structure in a subsequent low temperature precipitation reaction. Preferably, the precursor material of molybdenum oxide may be at least one selected from the group consisting of molybdates such as ammonium molybdate and sodium molybdate, and a MoO$_3$-ammonia solution in which bulk MoO$_3$ is dissolved in ammonia water.

A concentration of the precursor material of molybdenum oxide in the mixed aqueous solution of step 1 may be about 20 mM to 2400 mM, about 50 mM to 2200 mM, or about 100 mM to 2000 mM, based on Mo metal. When the concentration of the precursor material of molybdenum oxide is less than about 20 mM, the yield may be lowered due to dissolution of MoO$_3$, and there may be a problem in that MoO$_3$ is not produced at all. In addition, when the concentration is more than about 2400 mM, the precursor material of molybdenum oxide may not be dissolved in the mixed aqueous solution of step 1, so that the precursor material of molybdenum oxide may be mixed with nanorods of a hexagonal crystal structure.

The water-soluble cellulose used in step 1 allows the molybdenum oxide to have the nanorod shape of a hexagonal crystal structure through interaction between a cellulose functional group and the precursor of molybdenum oxide in the subsequent low temperature precipitation reaction. Preferably, the water-soluble cellulose may be dissolved in water at a certain amount or more, and have a cellulose functional group. In particular, in the case of performing the precipitation reaction without using carboxymethyl cellulose, the molybdenum oxide is obtained in a plate shape or in an amorphous shape even if micro-sized particles or nano-sized particles are produced. Accordingly, there is a problem in that a thin and long nanorod shape as in the present disclosure cannot be obtained.

In particular, the water-soluble cellulose in the mixed aqueous solution of step 1 is used as a structuring agent for the molybdenum oxide to have the nanorod shape of hexagonal crystal structure in the subsequent step. By using the water-soluble cellulose, hexagonal molybdenum oxide (h-MoO$_3$) in the form of nanorods can be easily produced even in a low temperature precipitation reaction at atmospheric pressure, without applying hydrothermal synthesis under high temperature and high pressure conditions. Examples of the water-soluble cellulose may include at least one selected from the group consisting of carboxymethyl cellulose (CMC), hydroxyethyl cellulose, and hydroxypropyl cellulose.

In the present disclosure, the aqueous solution containing the precursor material of molybdenum oxide is prepared by using the water-soluble cellulose in step 1. Therefore, the same effect can be obtained regardless of the type of cation without additionally performing a cation exchange process through the known ion exchange method, thereby simplifying the whole process.

A concentration of the water-soluble cellulose in the mixed aqueous solution of step 1 may be about 5 g/L to 100 g/L, about 6 g/L to 90 g/L, or about 6.5 g/L to 80 g/L, based on a volume of water added to the aqueous solution. When the concentration of the carboxymethyl cellulose (CMC) is less than about 5 g/L, there may be a problem in that microparticles are formed rather than the MoO$_3$ nanorods. In addition, when the concentration of the water-soluble cellulose exceeds about 100 g/L, precipitation of MoO$_3$ may not occur.

Further, in the mixed aqueous solution of step 1, a weight ratio of the precursor material of molybdenum oxide to the water-soluble cellulose may preferably be 1:0.05 to 1:5, 1:0.1 to 1:4, or 1:0.15 to 1:3. When the weight ratio is less than 1:0.05, the shape of the molybdenum oxide to be prepared by the precipitation reaction in the subsequent step may not be uniformly controlled, and when the weight ratio is more than 1:5, precipitation of molybdenum oxide may not occur.

Meanwhile, in step 1, at least one carbon-based conductive material such as carbon nanofiber, carbon nanotubes, graphene oxide, and the like may be further added to the mixed aqueous solution to prepare a composite containing the hexagonal molybdenum oxide (h-MoO$_3$) nanorods. Particularly, the obtained composite containing the hexagonal molybdenum oxide (h-MoO$_3$) nanorods and the carbon-based conductive material such as carbon nanofibers, carbon nanotubes, graphene oxide, and the like, may exhibit high power characteristics by improving conductivity with excellent energy storage capacity when applied as an electrode material for a pseudocapacitor.

Herein, a weight ratio of the precursor material of molybdenum oxide to the carbon-based conductive material may preferably be 1:0.01 to 1:0.5, 1:0.01 to 1:0.4, or 1:0.015 to 1:0.3. When the weight ratio is less than 1:0.01, conductivity may not be sufficiently improved by the carbon-based conductive material, and when the weight ratio is more than 1:0.5, a ratio of active MoO$_3$ may be reduced to lower the specific capacitance.

Step 1 of preparing the mixed aqueous solution may be performed at room temperature of about 20° C. to 25° C. and at atmospheric pressure of about 0.5 to 1.5 atm, preferably at about 1 atm.

(Step 2) Reacting an Inorganic Acid with the Mixed Aqueous Solution of Step 1

Step 2 is preparing the hexagonal molybdenum oxide (h-MoO$_3$) nanorod by heating the mixed aqueous solution of step 1 to a temperature of 50° C. to 100° C. and then adding an inorganic acid.

The inorganic acid may be a strong acid capable of sufficiently lowering the pH to about 2 or less, or 0.1 to 2, preferably about 1 or less, or about 0.2 to 1, and any component known to be usable in the art can be used without limitation. For example, at least one inorganic acid selected from the group consisting of hydrochloric acid, nitric acid, sulfuric acid, and bromic acid may be used. In particular, it is more preferable to use hydrochloric acid or nitric acid in terms of process convenience and cost reduction.

The amount of the inorganic acid is not particularly limited, but it is preferable to use the inorganic acid in an amount such that a molar ratio of the precursor material of molybdenum oxide to the inorganic acid used in step 1 is 1:0.5 to 1:2, 1:0.6 to 1:1.8, or 1:0.7 to 1:1.6. When the molar ratio is less than 1:0.6, the effect of using the inorganic acid is insignificant, so that precipitation may not occur. When the molar ratio is more than 1:2, the reaction effect may not substantially increase.

In addition, the reaction of step 2 is preferably performed by adjusting a pH of the reacted solution to about 2 or less, or about 0.1 to 2, preferably about 1 or less, or about 0.2 to 1 after adding the inorganic acid.

Meanwhile, step 2 may be performed by heating the mixed aqueous solution of step 1 to a temperature of about 50° C. or more, which is a reaction temperature, and then adding an inorganic acid. When the inorganic acid is added at a temperature below about 50° C., there may be a problem in particle uniformity due to formation of a molybdenum-cellulose composite.

The reaction of step 2 may be performed at a high temperature of about 50° C. to about 100° C., preferably about 55° C. to about 90° C., more preferably about 65° C. to about 85° C. When the reaction temperature is less than about 50° C., the reaction of step 2 may not proceed sufficiently even when the inorganic acid is added, and microparticles rather than nanorods of molybdenum oxide may be prepared. In addition, when the reaction temperature exceeds 100° C., overall process efficiency and cost may increase. This is because additional process equipment such as a hydrothermal reactor and a condenser may be required due to a boiling point of the water contained in the mixed aqueous solution.

The reaction of step 2 may be performed for about 2 hours to 55 hours, preferably about 3 to 50 hours, more preferably about 6 to 48 hours. When the reaction time is less than about 2 hours, the reaction with the inorganic acid may not be sufficiently performed, and the hexagonal molybdenum oxide (h-MoO$_3$) nanorods may not be prepared. In addition, when the reaction time of step 2 exceeds about 55 hours, the reaction may not substantially proceed further.

In addition, the precipitation reaction of step 2 may be performed at atmospheric pressure of about 0.5 to 1.5 atm, preferably at about 1 atm. When the reaction pressure is less than about 0.5 atm, a change in concentration due to water evaporation may occur and additional equipment may be required. When the reaction pressure exceeds about 1.5 atm, additional process equipment such as a hydrothermal reactor and a condenser may be required.

Meanwhile, when at least one carbon-based conductive material such as carbon nanofiber, carbon nanotubes, graphene oxide, and the like is further added to the mixed aqueous solution of step 1, it is preferable to perform step 2 by adding an inorganic acid after sufficiently dispersing the carbon-based conductive material through an ultrasonic disperser, or the like. When the carbon-based conductive material is not sufficiently dispersed, it is difficult to sufficiently improve the conductivity due to agglomeration of the carbon-based conductive material.

In addition, after performing step 2, the obtained composite of the hexagonal molybdenum oxide (h-MoO$_3$) nanorods and the carbon-based conductive material such as carbon nanofiber, carbon nanotubes, graphene oxide, and the like may be further subjected to heat treatment in a gas atmosphere containing hydrogen. Through this heat treatment process, partial reduction of h-MoO$_3$ and surface modification of the carbon-based conductive material such as CNF may occur, thereby further improving conductivity and energy storage capacity.

Specifically, the heat treatment may be performed at a temperature of about 200° C. to 350° C., or about 220° C. to about 340° C., under a condition of feeding 4 vol % H$_2$/Ar gas. When the heat treatment is performed at less than about 200° C., it may be difficult to sufficiently crystallize the particles. In addition, when the heat treatment is performed at a temperature of more than about 350° C., agglomeration of nanorods and conversion to molybdenum oxide (MoO$_3$) to an orthorhombic form may occur, and as a result, molybdenum oxide (MoO$_3$) microparticles in the orthorhombic form may be produced.

Hexagonal Molybdenum Oxide (h-MoO$_3$) Nanorod

The present disclosure also provides hexagonal molybdenum oxide (h-MoO$_3$) nanorods prepared by the above-described described preparation method.

The molybdenum oxide of the present disclosure is characterized by having a hexagonal crystal structure (h-MoO$_3$). Herein, the hexagonal refers to a crystal structure of the hexagonal crystal system. In particular, α-MoO$_3$ of the conventional orthorhombic crystal structure can store 1.5 lithium ions, whereas h-MoO$_3$ can store 1.6 lithium ions and thus has higher capacity.

In addition, the hexagonal molybdenum oxide (h-MoO$_3$) has a nanorod shape, and is characterized in that it has a thin and long rod shape, rather than the conventional plate-shaped, amorphous, or granular nanoparticles. In the case of the nanorod shape, high specific capacitance can be expected due to its large surface area and easy electron transfer.

In particular, the hexagonal molybdenum oxide (h-MoO$_3$) nanorods may have a diameter of about 30 nm to about 500 nm and a length of about 0.8 micrometers (μm) to about 10 micrometers (μm). Specifically, the hexagonal molybdenum oxide (h-MoO$_3$) nanorods may have a diameter of about 40 nm to about 400 nm, or about 50 nm to about 300 nm, and a length of about 0.9 μm to about 8 μm, or about 1 μm to about 4.5 μm.

In addition, the hexagonal molybdenum oxide (h-MoO$_3$) prepared according to the present disclosure is characterized by having a nanorod shape, and may have a diameter to length ratio (an aspect ratio) of about 1:2 to about 1:100, about 1:5 to about 1:50, or about 1:10 to about 1:40.

Since the hexagonal molybdenum oxide (h-MoO$_3$) nanorods have a large surface area, it may be well mixed with the carbon-based conductive material such as carbon nanofiber, carbon black, carbon nanotubes, and the like. Accordingly, the hexagonal molybdenum oxide (h-MoO$_3$) nanorods and the carbon-based conductive material may be provided in the form of a composite.

Anode for a Pseudocapacitor

In addition, the present disclosure provides an anode for a pseudocapacitor including the above-described hexagonal molybdenum oxide (h-MoO₃) nanorods.

In particular, the anode for a pseudocapacitor may include the hexagonal molybdenum oxide (h-MoO₃) nanorod in the form of a composite with a carbon-based conductive material.

Herein, the specific crystal structure, the shape, and the preparation method of the hexagonal molybdenum oxide (h-MoO₃) nanorods, the kind of carbon-based conductive material, and the like are as described above, and a detailed description thereof here will be omitted.

In addition, the anode for a pseudocapacitor may further include a binder and a conductive material in addition to the hexagonal molybdenum oxide (h-MoO₃) nanorods. For example, the anode for a pseudocapacitor may further include at least one conductive material selected from the group consisting of carbon black, acetylene black, activated carbon, carbon nanotubes, and Vulcan carbon. Preferably, carbon black, acetylene black, or the like may be used in terms of price and accessibility. In addition, the anode for a pseudocapacitor may further include at least one binder selected from the group consisting of poly-vinylidene fluoride (PDVF), polytetrafluoroethylene (PTFE), Nafion, and carboxymethyl cellulose (CMC). Preferably, PVDF, PTFE, or the like may be used in terms of structural stability in the electrolyte.

As described above, the preparation method according to the present disclosure can easily prepare hexagonal molybdenum oxide (h-MoO₃) having a nanorod shape even in a low temperature precipitation reaction at atmospheric pressure without applying hydrothermal synthesis under high temperature and high pressure conditions. The preparation method includes using water-soluble cellulose. The hexagonal molybdenum oxide (h-MoO₃) nanorods prepared therefrom can be properly mixed with carbon-based conductive materials such as carbon nanofiber, and thus can be usefully used as an anode material for a pseudocapacitor.

EXAMPLES

Hereinafter, the present invention will be described in more detail with reference to examples. However, these examples are for illustrative purposes only, and the invention is not intended to be limited by these examples.

EXAMPLES

Preparation of h-MoO₃ Nanorod

Example 1

(Step 1)
3.7 g of ammonium molybdate ((NH₄)₂MoO₄) and 1 g of carboxymethyl cellulose (CMC) were added to a reaction vessel, and 100 mL of water was added thereto. Thereafter, they were dissolved in water using agitation and sonication at room temperature for about 60 minutes to prepare a mixed aqueous solution. Herein, a concentration of the precursor material of molybdenum oxide was about 210 mM and a concentration of the carboxymethyl cellulose was about 10 g/L.

(Step 2)
After heating the mixed aqueous solution of step 1 to a temperature of about 85° C. at atmospheric pressure, 2.5 g of 6 M HCl was added thereto to adjust the pH to 1, and then a reaction proceeded for about 9 hours. Herein, a molar ratio of the precursor material of molybdenum oxide and HCl was 1:0.7. After the reaction was completed, the reacted solution was centrifuged at about 10,000 rpm for about 5 minutes, and the obtained precipitate was washed several times with ethanol to obtain 2.4 g of molybdenum oxide (MoO₃) (yield: 80%).

Figure 1:
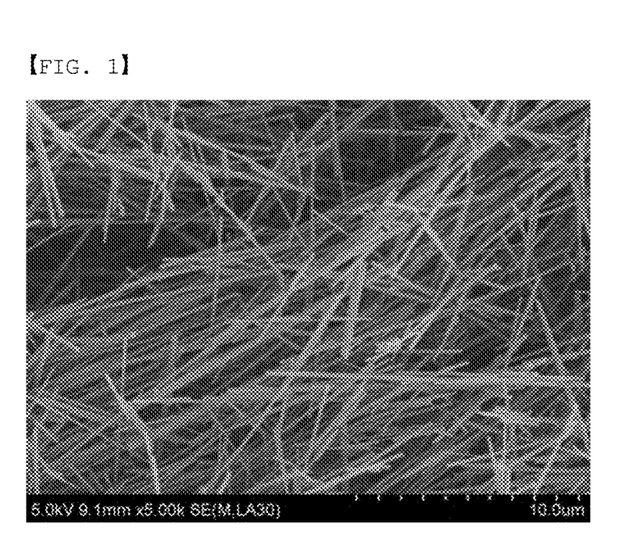
FIG. 1 is a SEM image of hexagonal molybdenum oxide (h-$MoO_3$) nanorods prepared according to Example 1 of the present disclosure.

As a result of XRD measurement, it was confirmed from the values of 19.2°, 25.8°, and 29.2° that the obtained molybdenum oxide (MoO₃) was h-MoO₃ having a hexagonal crystal structure. In addition, the result of observing the obtained molybdenum oxide (MoO₃) by a scanning electron microscope (SEM) is shown in FIG. 1. As shown in FIG. 1, it was confirmed that it had a nanorod shape having a diameter of about 150 nm and a length of about 2.5 micrometers (μm).

Example 2

2.2 g of molybdenum oxide (MoO₃) was obtained in the same manner as in Example 1, except that the reaction of step 2 was performed at atmospheric pressure and at 65° C. for about 24 hours (yield: 73%).

Figure 2:
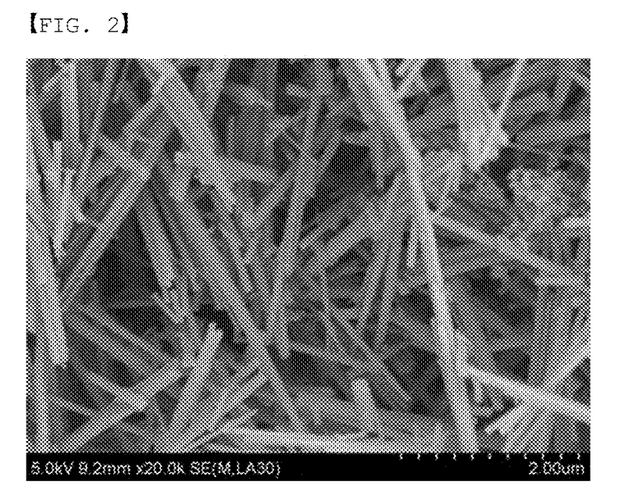
FIG. 2 is a SEM image of hexagonal molybdenum oxide (h-$MoO_3$) nanorods prepared according to Example 2 of the present disclosure.

As a result of XRD measurement, it was confirmed from the values of 19.2°, 25.8°, and 29.2° that the obtained molybdenum oxide (MoO₃) was h-MoO₃ having a hexagonal crystal structure. In addition, the result of observing the obtained molybdenum oxide (MoO₃) by a scanning electron microscope (SEM) is shown in FIG. 2. As shown in FIG. 2, it was confirmed that it had a nanorod shape having a diameter of about 150 nm and a length of about 2.5 micrometers (μm).

Example 3

2.3 g of molybdenum oxide (MoO₃) was obtained in the same manner as in Example 1, except that the reaction of step 2 was performed at atmospheric pressure and at 50° C. for about 48 hours (yield: 73%).

Figure 3:
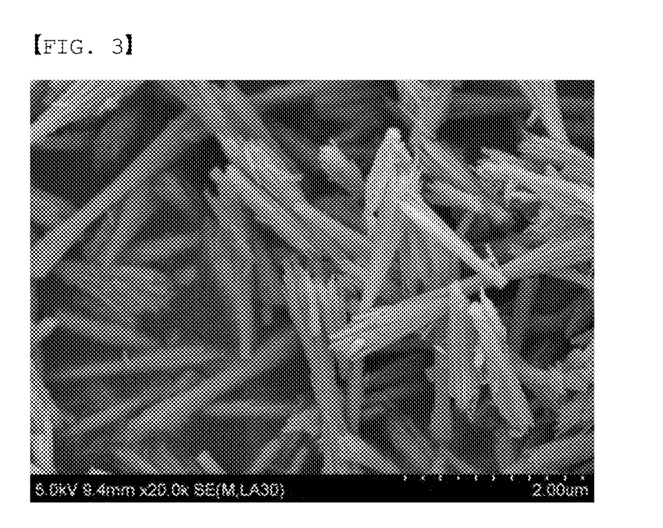
FIG. 3 is a SEM image of hexagonal molybdenum oxide (h-$MoO_3$) nanorods prepared according to Example 3 of the present disclosure.

As a result of XRD measurement, it was confirmed from the values of 19.2°, 25.8°, and 29.2° that the obtained molybdenum oxide (MoO₃) was h-MoO₃ having a hexagonal crystal structure. In addition, the result of observing the obtained molybdenum oxide (MoO₃) by a scanning electron microscope (SEM) is shown in FIG. 3. As shown in FIG. 3, it was confirmed that it had a nanorod shape having a diameter of about 50 nm and a length of about 1 micrometer (μm).

Preparation of h-MoO₃ Nanorod-CNF Composite

Example 4

(Step 1)
3.7 g of ammonium molybdate ((NH₄)₂MoO₄), 1 g of carboxymethyl cellulose (CMC), and 100 mg of carbon nanofiber (CNF) were added to a reaction vessel, and 100 mL of water was added thereto. Thereafter, they were dissolved in water using agitation and sonication at room temperature for about 60 minutes to prepare a mixed aqueous solution. Herein, a concentration of the precursor material of molybdenum oxide was about 210 mM, and a concentration of the carboxymethyl cellulose was about 10 g/L.

(Step 2)
After heating the mixed aqueous solution of step 1 to a temperature of about 85° C. at atmospheric pressure, 2.5 g of 6 M HCl was added thereto to adjust the pH to 1, and then a reaction proceeded for about 9 hours. After the reaction was completed, the reacted solution was centrifuged at about 10,000 rpm for about 5 minutes, and the obtained precipitate was washed several times with ethanol to obtain 2.5 g of a molybdenum oxide ($MoO_3$)-carbon fiber (CNF) composite (yield: 80%).

Figure 4:
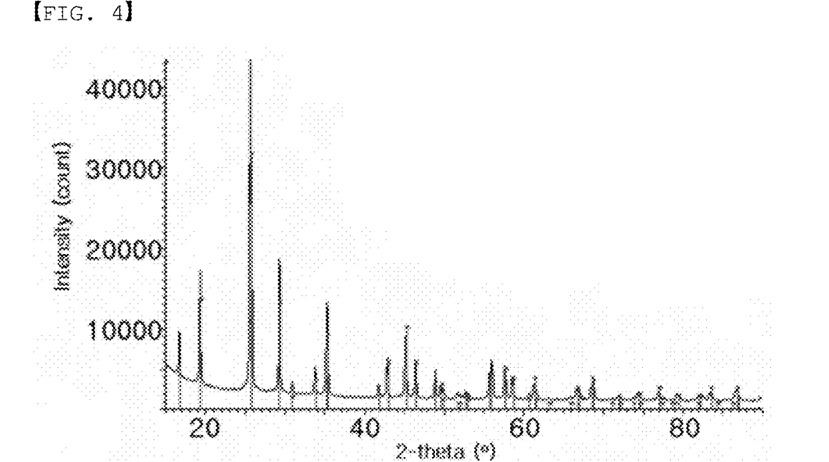
FIG. 4 is an XRD measurement graph of hexagonal molybdenum oxide nanorod-carbon fiber (h-$MoO_3$ nanorod-CNF) composite prepared according to Example 4 of the present disclosure.
Figure 6:
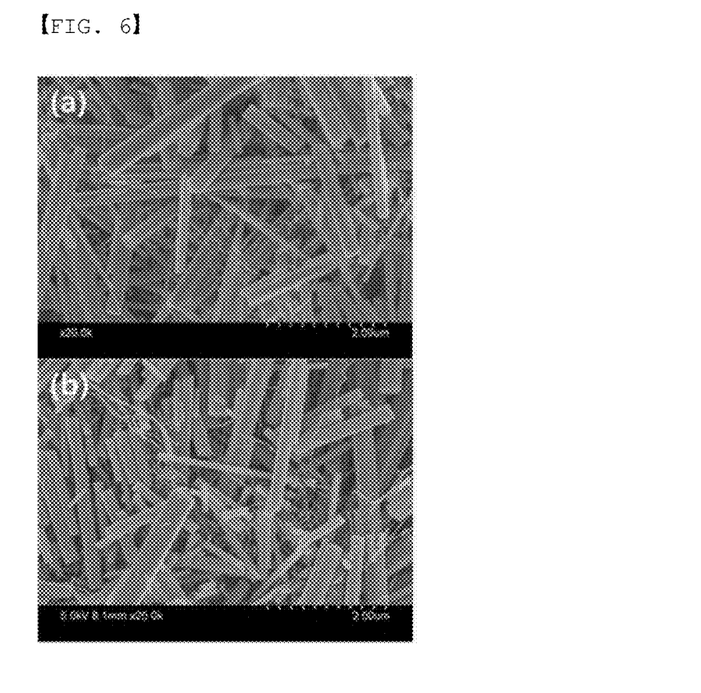
FIG. 6A and FIG. 6B are SEM images of hexagonal molybdenum oxide nanorod-carbon fiber (h-$MoO_3$ nanorod-CNF) composite prepared according to Example 4 and Example 5, respectively.

The XRD measurement result of the obtained molybdenum oxide ($MoO_3$)-carbon fiber (CNF) composite is shown in FIG. 4. As shown in FIG. 4, it was confirmed from the values of 19.2°, 25.8°, and 29.2° that h-$MoO_3$ having a hexagonal crystal structure was prepared. In addition, the result of observing the obtained molybdenum oxide ($MoO_3$) by a scanning electron microscope (SEM) is shown in FIG. 6A. As shown in FIG. 6A, it was confirmed that the h-$MoO_3$-CNF composite had yarn-like CNF mixed with thicker nanorods, and the nanorods had a nanorod shape with a diameter of about 250 nm and a length of about 2.5 micrometers (μm). Accordingly, the composite was confirmed to be a carbon fiber composite including the hexagonal molybdenum oxide (h-$MoO_3$) nanorod (h-$MoO_3$ nanorod-CNF composite).

Example 5

The carbon fiber composite of hexagonal molybdenum oxide (h-$MoO_3$ nanorod-CNF composite) obtained in Example 4 was heat treated at about 300° C. for about 3 hours in the presence of argon mixed gas containing 4% of $H_2$.

Figure 5:
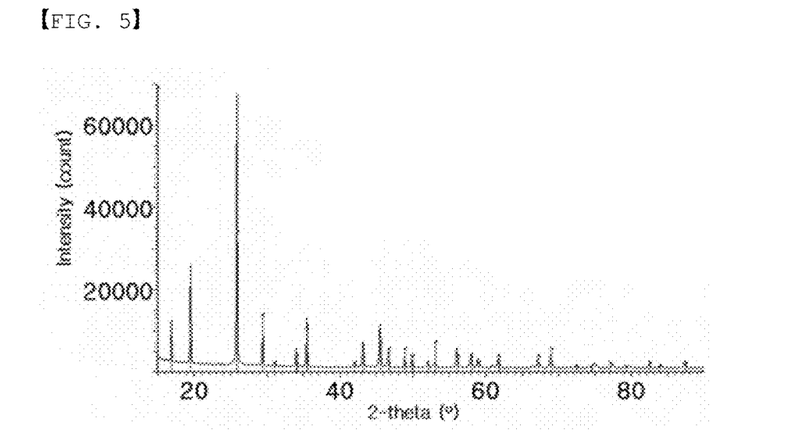
FIG. 5 is an XRD measurement graph of hexagonal molybdenum oxide nanorod-carbon fiber (h-$MoO_3$ nanorod-CNF) composite prepared according to Example 5 of the present disclosure.

The XRD measurement result of the obtained molybdenum oxide ($MoO_3$)-carbon fiber (CNF) composite is shown in FIG. 5. As shown in FIG. 5, it was confirmed from the values of 19.2°, 25.8°, and 29.2° that h-$MoO_3$ having a hexagonal crystal structure was prepared. In addition, the result of observing the obtained molybdenum oxide ($MoO_3$) by a scanning electron microscope (SEM) is shown in FIG. 6B. As shown in FIG. 6B, it was confirmed that the h-$MoO_3$-CNF composite had yarn-like CNF mixed with thicker nanorods, and the nanorods had a nanorod shape with a diameter of about 250 nm and a length of about 2.5 micrometers (μm). Accordingly, the composite was confirmed to be a carbon fiber composite including the hexagonal molybdenum oxide (h-$MoO_3$) nanorod (h-$MoO_3$ nanorod-CNF composite).

Comparison Experiment of h-$MoO_3$ Nanorods

Comparative Example 1

2.1 g of molybdenum oxide was obtained in the same manner as in Example 1, except that the mixed aqueous solution was prepared without adding carboxymethyl cellulose (CMC) in step 1 (yield: 70%).

Figure 7:
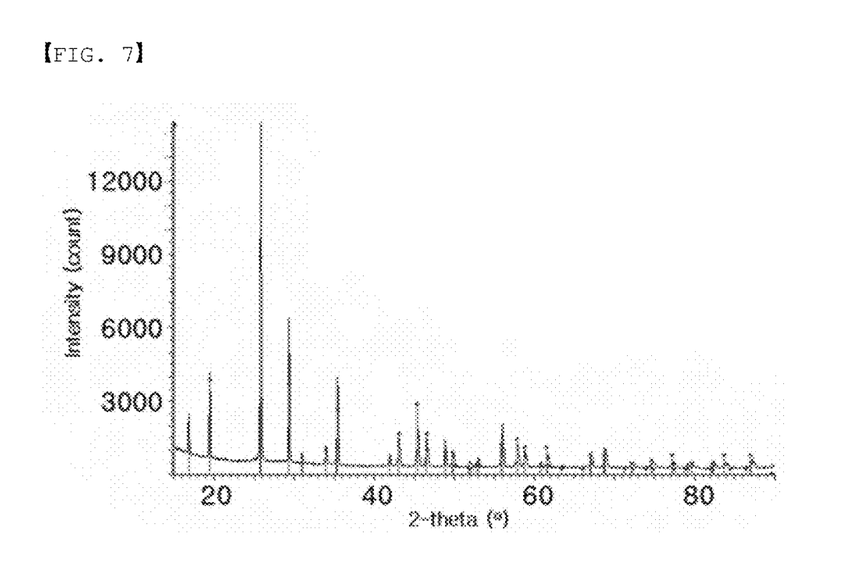
FIG. 7 is an XRD measurement graph of hexagonal molybdenum oxide (h-$MoO_3$) prepared according to Comparative Example 1.
Figure 8:
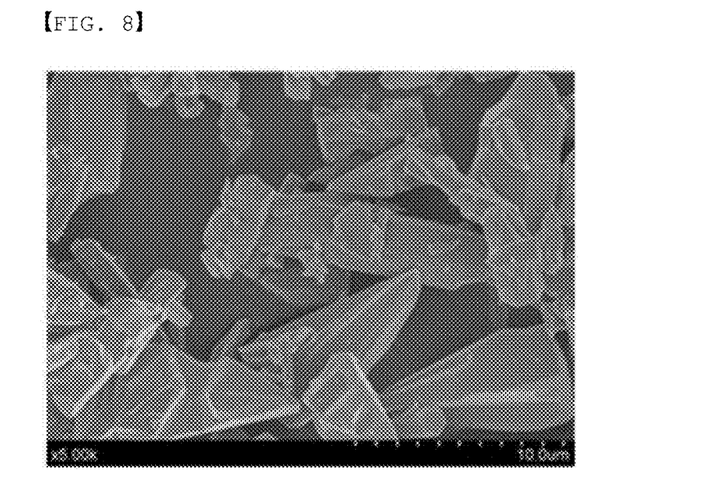
FIG. 8 is a SEM image of hexagonal molybdenum oxide (h-$MoO_3$) amorphous particles prepared according to Comparative Example 1.

The XRD measurement result of the obtained molybdenum oxide ($MoO_3$) is shown in FIG. 7. As shown in FIG. 7, it was confirmed from the values of 19.2°, 25.8°, and 29.2° that h-$MoO_3$ having a hexagonal crystal structure was prepared. In addition, the result of observing the obtained molybdenum oxide ($MoO_3$) by a scanning electron microscope (SEM) is shown in FIG. 8. As shown in FIG. 8, it was confirmed that micro-sized amorphous particles having a number average particle size of about 10 μm were prepared.

Comparative Examples 2 to 5

2.3 g of molybdenum oxide was obtained in the same manner as in Example 1, except that the mixed aqueous solution was prepared by adding 1 g of PVP (poly(vinyl pyrrolidone)), 1 g of PAA (poly(acrylic acid)), 1 g of PVA (poly(vinyl alcohol)), or 1 g of PSS (poly(styrene sulfonate)) instead of the carboxymethyl cellulose (CMC) in step 1 (yield: 76%).

Figure 9:
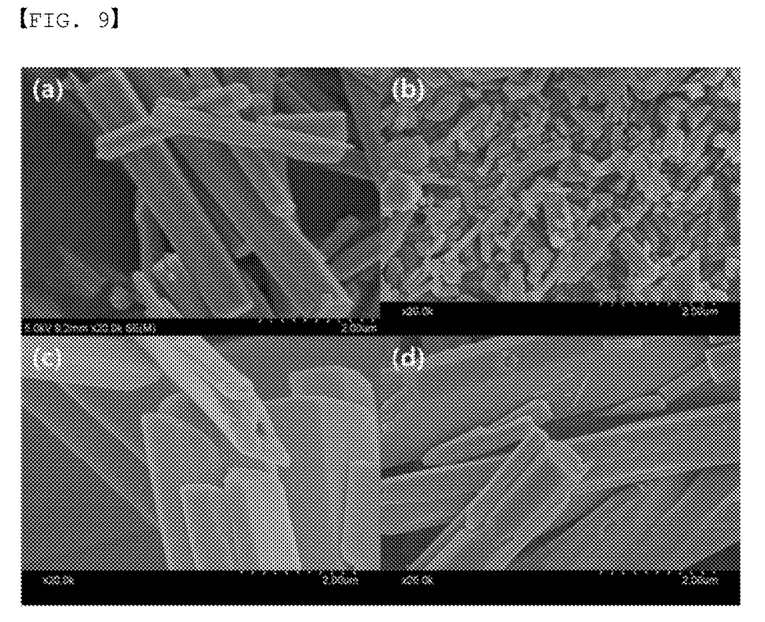
FIG. 9A, FIG. 9B, FIG. 9C and FIG. 9D are SEM images of hexagonal molybdenum oxide (h-$MoO_3$) particles prepared according to Comparative Examples 2 to 5, respectively.

As a result of XRD measurement, it was confirmed from the values of 19.2°, 25.8°, and 29.2° that the obtained molybdenum oxide ($MoO_3$) is h-$MoO_3$ having a hexagonal crystal structure. In addition, the result of observing the obtained molybdenum oxide ($MoO_3$) by a scanning electron microscope (SEM) is shown in FIG. 9. As shown in FIG. 9, it was confirmed that Comparative Example 2 (FIG. 9A: PVP) had a nanorod shape with a diameter of about 600 nm and a length of about 5 μm, and Comparative Example 3 (FIG. 9B: PAA) had amorphous nanoparticles with a diameter of about 1 μm. It was also confirmed that Comparative Example 4 (FIG. 9C: PVA) had a microrod shape with a diameter of about 1 μm and a length of about 20 μm, and Comparative Example 5 (FIG. 9D: PSS) had a nanorod shape with a diameter of about 800 nm and a length of about 10 μm.

Comparative Example 6

A molybdenum-CMC composite was obtained in the same manner as in Example 1, except that the reaction of step 2 was performed at atmospheric pressure and at room temperature (about 25° C.) for about 24 hours.

Figure 10:
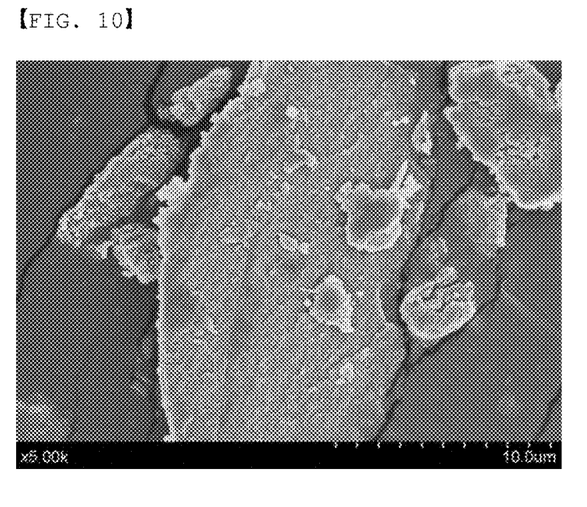
FIG. 10 is a SEM image of the molybdenum oxide ($MoO_3$) particles prepared according to Comparative Example.

The result of observing the obtained molybdenum oxide ($MoO_3$) by a scanning electron microscope (SEM) is shown in FIG. 10. As shown in FIG. 10, it was confirmed that it had a microparticle shape having a diameter of about 10 μm or more.

Comparative Example 7

2.1 g of molybdenum oxide ($MoO_3$) was obtained in the same manner as in Example 1, except that the inorganic acid was added at room temperature before the mixed aqueous solution was heated, and then heated to a temperature of about 85° C. at atmospheric pressure and reacted for about 9 hours (yield: 70%).

Figure 11:
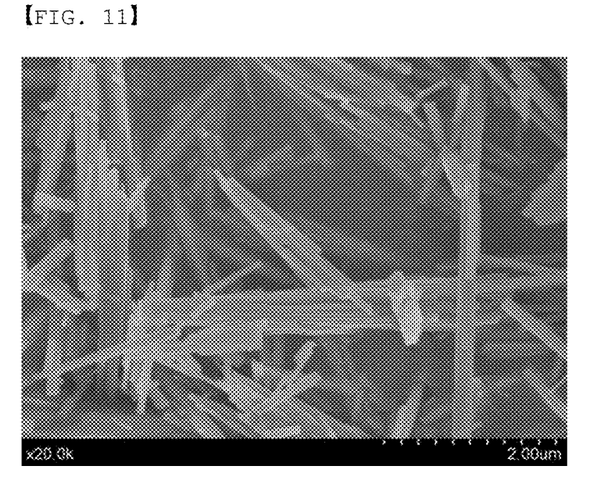
FIG. 11 is a SEM image of hexagonal molybdenum oxide (h-$MoO_3$) particles prepared according to Comparative Example 7.
Figure 12:
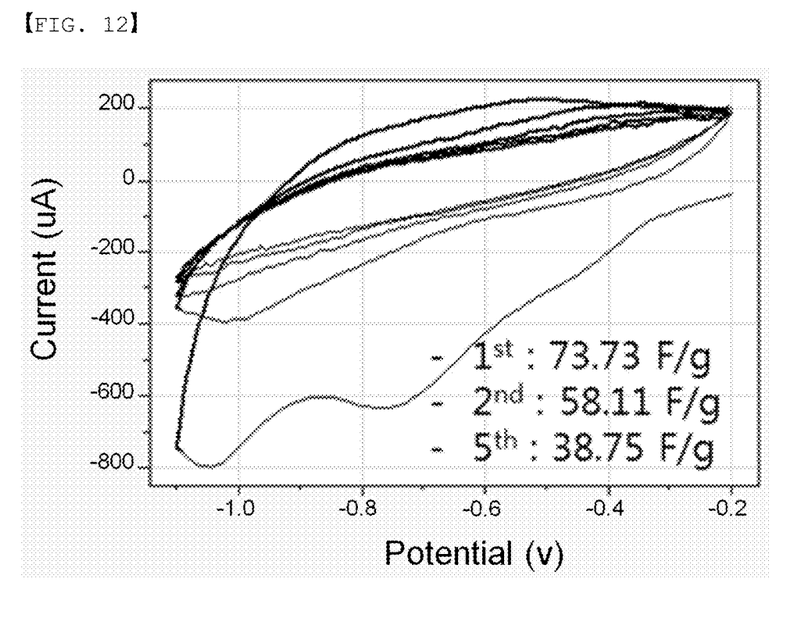
FIG. 12 is a graph determined by cyclic voltammetry in an electrode system of Experimental Example 1 using hexagonal molybdenum oxide (h-$MoO_3$) nanorods prepared according to Example 1 of the present disclosure as an active material (x-axis: potential with respect to Ag/AgCl reference electrode, y-axis: current, specific capacitance: 38.75 F/g in the $5^{th}$ cycle).
Figure 13:
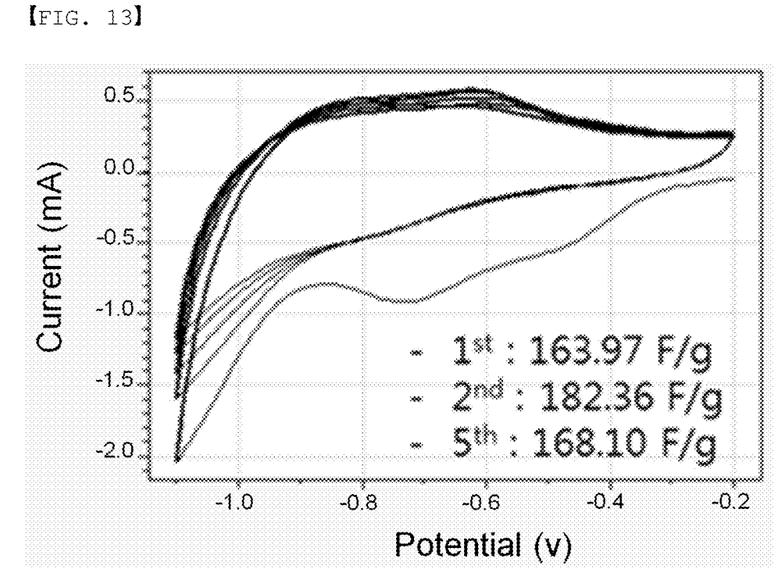
FIG. 13 is a graph determined by cyclic voltammetry in an electrode system of Experimental Example 1 using the hexagonal molybdenum oxide nanorod-carbon fiber (h-$MoO_3$ nanorod-CNF) composite prepared according to Example 4 of the present disclosure as an active material (x-axis: potential with respect to Ag/AgCl reference electrode, y-axis: current, specific capacitance: 168.10 F/g in the $5^{th}$ cycle).
Figure 14:
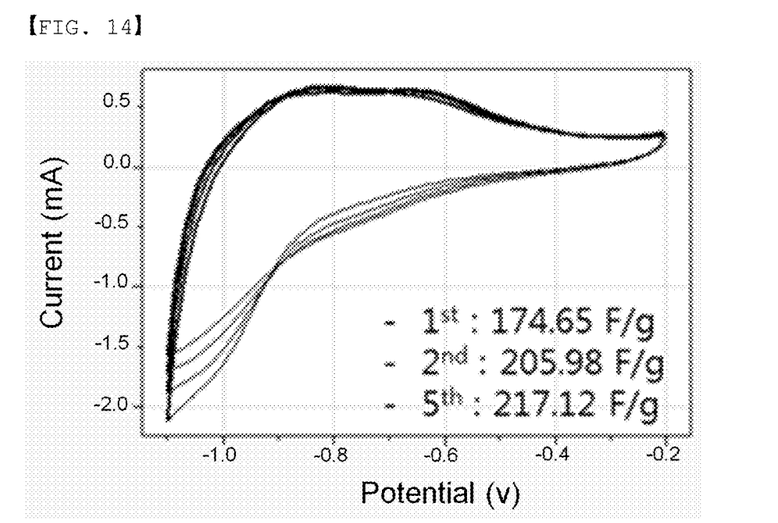
FIG. 14 is a graph determined by cyclic voltammetry in an electrode system of Experimental Example 1 using the hexagonal molybdenum oxide nanorod-carbon fiber (h-$MoO_3$ nanorod-CNF) composite prepared according to Example 5 of the present disclosure as an active material (x-axis: potential with respect to Ag/AgCl reference electrode, y-axis: current, specific capacitance: 217.12 F/g in the $5^{th}$ cycle).

As a result of XRD measurement, it was confirmed from the values of 19.2°, 25.8°, and 29.2° that the obtained molybdenum oxide ($MoO_3$) is h-$MoO_3$ having a hexagonal crystal structure. In addition, the result of observing the obtained molybdenum oxide ($MoO_3$) by a scanning electron microscope (SEM) is shown in FIG. 11. As shown in FIG. 11, it was confirmed that it had a nanorod shape having a diameter of about 150 nm and a length of about 2.5 μm, but uniformity was significantly lowered compared with the nanorods of Example 1.

Experimental Examples

After preparing an electrode for a pseudocapacitor using the molybdenum oxide prepared in one of Examples 1 to 5 and Comparative Example 1 as an anode active material, battery performance thereof was evaluated.

Preparation of Pseudocapacitor

To measure electrochemical performance, the active material, a conductive material (acetylene black), and a binder (PVDF) were dispersed in NMP at a mass ratio of 70:20:10, and then applied on a glassy carbon electrode at a loading amount of about ~1 mg/$cm^2$ (based on total solids)

and dried to prepare a pseudocapacitor electrode (active material:conductive material:binder=70:20:10 based on total solids material).

Evaluation of Battery Performance

The specific capacitance and constant current of the pseudocapacitor were evaluated by cyclic voltammetry using Ag/AgCl as a reference electrode in a voltage range of 0 V to −1.1 V.

In evaluating the electrochemical performance by three-electrode measurement in a 1 M $Li_2SO_4$ solution, the maximum capacity at the $5^{th}$ cycle was measured (active material:conductive material:binder=70:20:10 based on total solids material).

The measurement results of specific capacitance of the electrodes for a pseudocapacitor including one of the molybdenum oxide prepared according to Examples 1 to 5 and Comparative Example 1 as an anode active material are shown in Table 1 below.

TABLE 1

|  | Specific capacitance (based on $5^{th}$ cycle, F/g) |
| --- | --- |
| Example 1 | 38.75 |
| Example 2 | 67.3 |
| Example 3 | 82.9 |
| Example 4 | 168.10 |
| Example 5 | 217.12 |
| Comparative Example 1 | ~30 |

In addition, graphs determined by cyclic voltammetry in an electrode system for the pseudocapacitor using one of the hexagonal molybdenum oxide nanorods, the composite including the same, and the amorphous molybdenum oxide prepared in Example 1 and Comparative Examples 1 and 2 as an anode active material are shown in FIGS. 12 to 14, and 17, respectively. The measurement results of specific capacitance are as shown in Table 1 above.

As shown in Table 1 above, it was confirmed that the hexagonal molybdenum oxide (h-$MoO_3$) nanorods of Examples 1 to 3 easily prepared by the low temperature precipitation reaction at atmospheric pressure by using water-soluble cellulose without applying hydrothermal synthesis under high temperature and high pressure conditions exhibited higher specific capacitance (38.75 F/g to 82.9 F/g) than the amorphous molybdenum oxide ($MoO_3$) of Comparative Example 1 (about 30 F/g) prepared without using water-soluble cellulose. This is because the hexagonal molybdenum oxide (h-$MoO_3$) nanorods have a large surface area and enable easy electron transfer.

In particular, in the case of the carbon fiber composites (h-$MoO_3$ nanorod-CNF composite) of Examples 4 and 5 including the hexagonal molybdenum oxide (h-$MoO_3$) nanorods prepared according to the present disclosure, the hexagonal molybdenum oxide (h-$MoO_3$) nanorods were well mixed with the carbon-based conductive material because of their large surface area, so that the specific capacitance was significantly increased to 168.10 F/g to 217.12 F/g.

Figure 15:
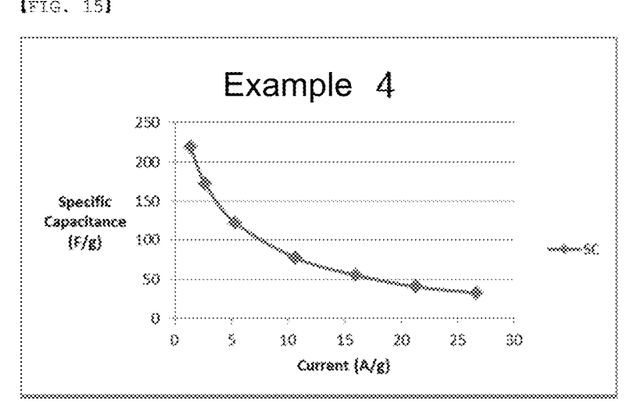
FIG. 15 is a graph of current vs. specific capacitance measured in an electrode system of Experimental Example 1 using the hexagonal molybdenum oxide nanorod-carbon fiber (h-MoO$_3$ nanorod-CNF) composite prepared according to Example 4 of the present disclosure as an active material.
Figure 16:
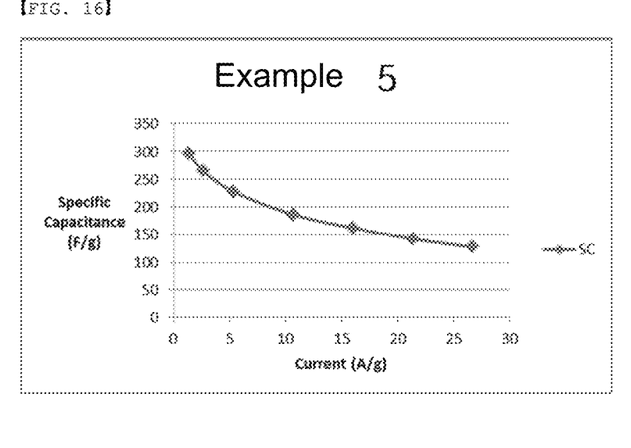
FIG. 16 is a graph of current vs. specific capacitance measured in an electrode system of Experimental Example 1 using the hexagonal molybdenum oxide nanorod-carbon fiber (h-MoO$_3$ nanorod-CNF) composite prepared according to Example 5 of the present disclosure as an active material.
Figure 17:
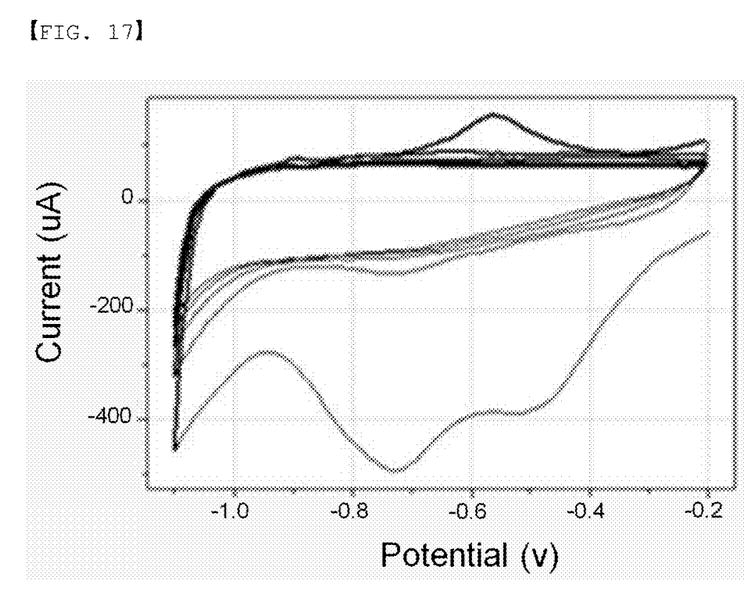
FIG. 17 is a graph determined by cyclic voltammetry in an electrode system of Experimental Example 1 using the hexagonal molybdenum oxide prepared according to Comparative Example 1 of the present disclosure as an active material (x-axis: potential with respect to Ag/AgCl reference electrode, y-axis: current, specific capacitance: about ~30 F/g in the 5$^{th}$ cycle).

In addition, graphs of current vs. specific capacitance measured in an electrode system of Experimental Example 1 using one of the carbon fiber composites (h-$MoO_3$ nanorod-CNF composite) prepared in Examples 4 and 5 of the present disclosure as an active material are shown in FIGS. 15 and 16, respectively. As shown in FIGS. 15 and 16, it can be confirmed that it is possible to induce partial reduction of $MoO_3$ by heat treatment under the mixed gas condition, which can improve electrical conductivity of $MoO_3$ to increase specific capacitance and power characteristics.

The invention claimed is:

1. A preparation method for a hexagonal molybdenum oxide (h-$MoO_3$) nanorod, comprising the steps of:
   preparing a mixed aqueous solution containing a precursor material of molybdenum oxide and water-soluble cellulose; and
   reacting the mixed aqueous solution by heating the mixed aqueous solution to a temperature of 50° C. to 100° C., and then adding an inorganic acid.

2. The preparation method according to claim 1, wherein the precursor material of molybdenum oxide is at least one selected from the group consisting of ammonium molybdate, sodium molybdate, and a $MoO_3$-ammonia solution.

3. The preparation method according to claim 1, wherein the water-soluble cellulose is at least one selected from the group consisting of carboxymethyl cellulose, hydroxyethyl cellulose, and hydroxypropyl cellulose.

4. The preparation method according to claim 1, wherein a weight ratio of the precursor material of molybdenum oxide to the water-soluble cellulose is 1:0.05 to 1:5.

5. The preparation method according to claim 1, wherein the inorganic acid is at least one selected from the group consisting of hydrochloric acid, nitric acid, sulfuric acid, and bromic acid.

6. The preparation method according to claim 1, wherein a molar ratio of the precursor material of molybdenum oxide to the inorganic acid is 1:0.5 to 1:2.

7. The preparation method according to claim 1, wherein preparing the mixed aqueous solution further comprises adding at least one carbon-based conductive material selected from the group consisting of carbon nanofiber, carbon nanotubes, and graphene oxide to the mixed aqueous solution.

8. The preparation method according to claim 1, wherein reacting the mixed aqueous solution comprises reducing a pH of the solution to 2 or less after adding the inorganic acid.

9. The preparation method according to claim 1, wherein reacting the mixed aqueous solution is performed for 2 hours to 55 hours.

10. The preparation method according to claim 1, wherein reacting the mixed aqueous solution is performed at a reaction pressure of 0.5 atm to 1.5 atm.

11. The preparation method according to claim 1, wherein the hexagonal molybdenum oxide (h-$MoO_3$) nanorods have a diameter of 30 nm to 500 nm and a length of 0.8 micrometers to 10 micrometers.

12. The preparation method according to claim 1, wherein the hexagonal molybdenum oxide (h-$MoO_3$) nanorods have a diameter to length ratio of 1:2 to 1:100.

* * * * *